J. B. MERKEL & G. J. CARROLL.
FILM WINDING MECHANISM FOR MOVING PICTURE MACHINES.
APPLICATION FILED MAR. 2, 1912.

1,086,198.

Patented Feb. 3, 1914.

3 SHEETS—SHEET 1.

Inventors
Jacob B. Merkel and
George J. Carroll.
By Victor J. Evans,

Witnesses:
Christ Feinle, Jr.,
James Kotul

J. B. MERKEL & G. J. CARROLL.
FILM WINDING MECHANISM FOR MOVING PICTURE MACHINES.
APPLICATION FILED MAR. 2, 1912.

1,086,198.

Patented Feb. 3, 1914.

3 SHEETS—SHEET 2.

Witnesses:
Christ Feinle, Jr.
James Koch

Inventors,
Jacob B. Merkel
George J. Carroll.
By Victor J. Evans,
Attorney

J. B. MERKEL & G. J. CARROLL.
FILM WINDING MECHANISM FOR MOVING PICTURE MACHINES.
APPLICATION FILED MAR. 2, 1912.
1,086,198. Patented Feb. 3, 1914.
3 SHEETS—SHEET 3.
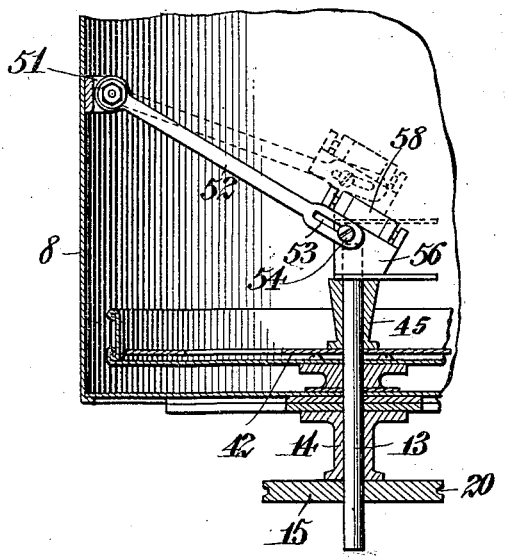
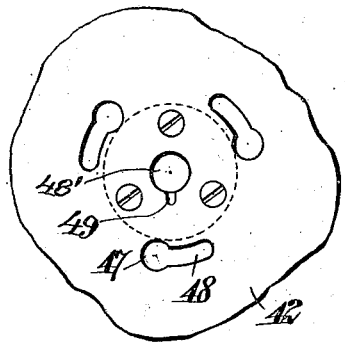
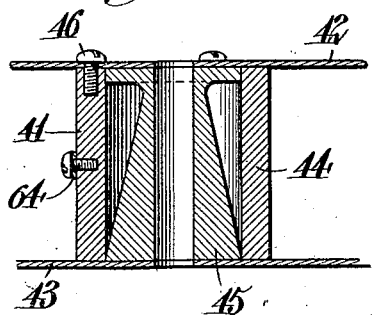
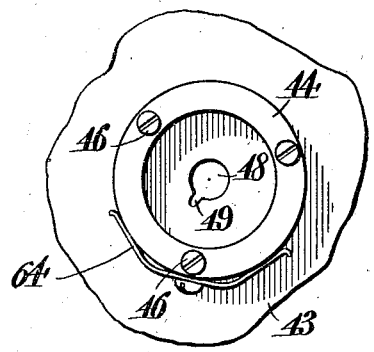
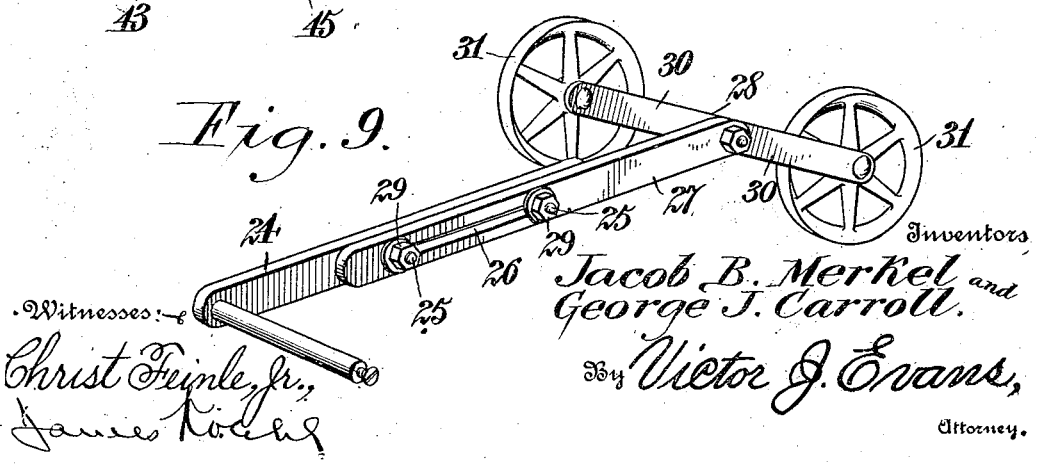
Inventors
Jacob B. Merkel and
George J. Carroll.
By Victor J. Evans,
Attorney.
Witnesses:
Christ Feinle, Jr.
James Koch

UNITED STATES PATENT OFFICE.

JACOB B. MERKEL AND GEORGE J. CARROLL, OF TAMAQUA, PENNSYLVANIA.

FILM-WINDING MECHANISM FOR MOVING-PICTURE MACHINES.

1,086,198.        Specification of Letters Patent.        Patented Feb. 3, 1914.

Application filed March 2, 1912. Serial No. 681,031.

*To all whom it may concern:*

Be it known that we, JACOB B. MERKEL and GEORGE J. CARROLL, citizens of the United States, residing at Tamaqua, in the county of Schuylkill and State of Pennsylvania, have invented new and useful Improvements in Film-Winding Mechanism for Moving-Picture Machines, of which the following is a specification.
This invention relates to film winding mechanism and particularly to an improvement over the device shown in our Patent No. 1,021,617 of March 26, 1912.

An object of the invention is to provide means for simultaneously revolving the magazine tray and the winding reel so as to exert an even pull on the film with the resultant elimination of the snap of the film as it leaves the magazine tray.
Another object of the invention is to provide a winding reel of separable sections whereby the sections can be readily disconnected from each other and the wound film left remaining upon one of the sections so that this section can be placed in the tray of the magazine.

Another object of the invention is to construct one of the sections of the separable reel so as to insure the free unwinding or the passage of the film therefrom.

Figure 1:
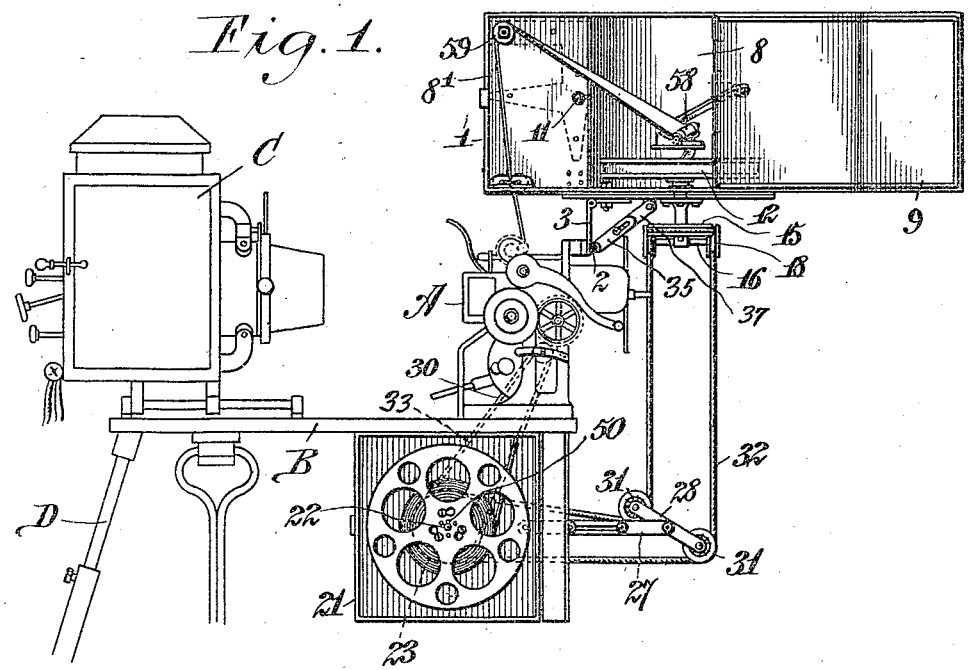
Figure 2:
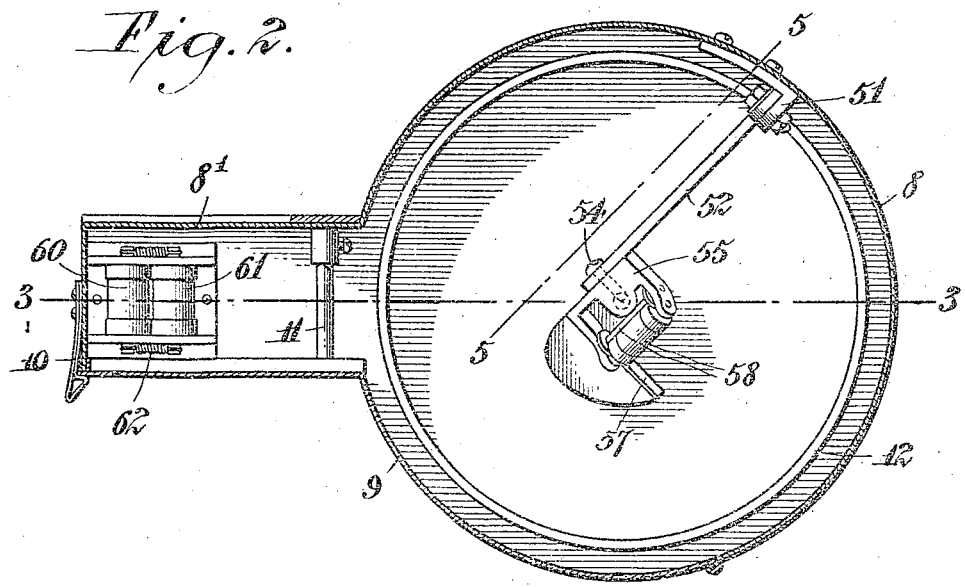
Figure 3:
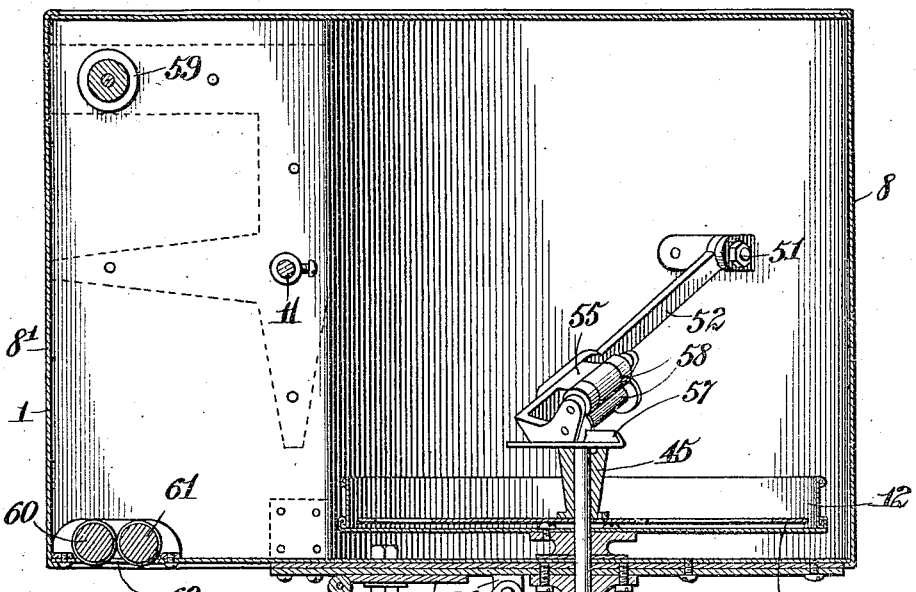
Figure 4:
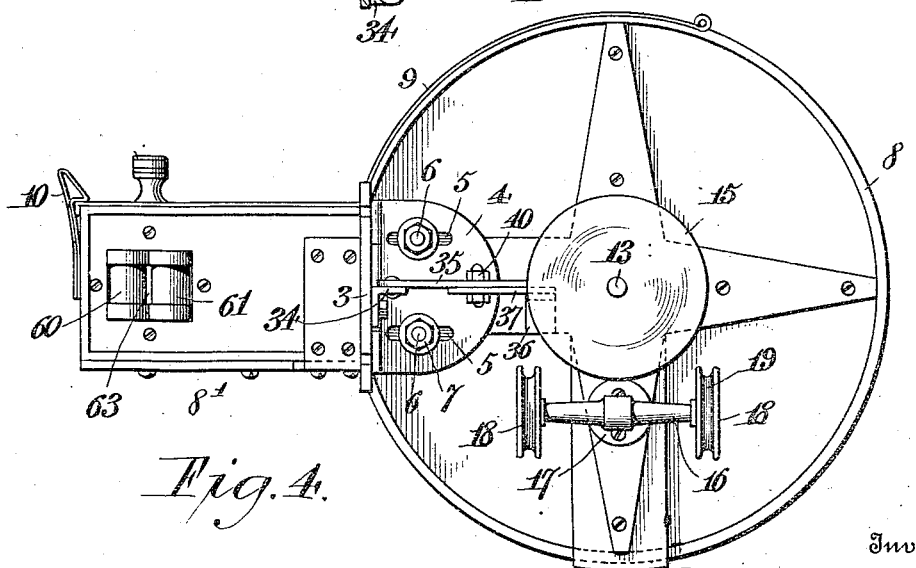

Another object of the invention is to provide means for holding the coil or film operatively associated in the tray of the magazine.
Another object of the invention is to provide means whereby the magazine can be adjusted to effect a proper framing of the picture upon the screen and for maintaining the tray in a horizontal position.
In the drawing forming a portion of this application and in which like letters of reference indicate similar parts in the several views:—Figure 1 is a side view of a moving picture machine showing the application of the film winding mechanism thereto. Fig. 2 is a horizontal section through the upper magazine. Fig. 3 is a section taken on the line 3—3 of Fig. 2 showing parts in full line. Fig. 4 is a bottom plan view of the upper magazine. Fig. 5 is a section on line 5—5 of Fig. 2 showing parts in full lines. Fig. 6 is a side view of one of the sections of the winding reel. Fig. 7 is a view similar to Fig. 6 showing a portion of the other section of the winding reel. Fig. 8 is a section through the central portion of the winding reel. Fig. 9 is a perspective view of the belt tensioning device.

The moving picture machine A conventionally shown herein may be of any suitable well known type or construction, being mounted upon the usual table B and arranged in proper proximity with the lamp house C. The table B is preferably supported by telescopic legs D whereby the table can be adjusted angularly with relation to the picture screen so as to insure the proper framing of the pictures thereon.

The upper magazine 1 is disposed uppermost with relation to the machine A and secured as at 2 to the front of the said machine A is a leaf 3 of a suitable hinge. This hinge has its companion leaf 4 adjustably mounted upon the bottom of the said magazine 1, and as illustrated this leaf has formed therein a pair of elongated slots 5 through which clamping bolts 6 of the magazine 1 extend. These bolts are provided with nuts 7 which are adapted to bear against the bottom of the leaf 4 so as to hold the same securely frictionally engaged against the bottom of the magazine and hence held in an adjusted position thereon. The hinge embodying the companion leaves 3 and 4 provides means whereby the upper magazine 1 can be adjusted angularly as to the adjustment of the table B whereby the pan of the upper magazine is maintained in a horizontal position.

The magazine 1 is constructed of metal and it is provided with a main cylindrical body portion 8 and a communicating vertical portion 8', the latter being substantially of rectangular configuration in transverse section as clearly shown in Fig. 2 of the drawings. One side of each of the portions 8 and 8' of the magazine is open, and as illustrated the magazine carries a suitable closure 9 which is designed to close the openings in the portions 8 and 8' as shown in Fig. 2. The end wall of the portion 8' carries a suitable latch 10 which is adapted to engage against the closure 9 to hold the same in a closed position. From one of the side walls of the portion 8' of the said magazine extends a fixed spindle 11 upon which a picture reel may be supported on the initial showing or display of the picture, the said spindle being adapted to support the reel in the usual vertical position. A pan 12 is secured upon a vertical driven shaft 13 which extends through the bottom of the portion 8 of the said magazine 1. This pan has its driven shaft 13 mounted in a suitable bearing 14 upon the bottom of the portion 8 and beneath the said bearing and keyed or otherwise suitably secured to the shaft 13 is a horizontally disposed relatively large pulley 15. A horizontal shaft 16 is mounted as at 17 upon the bottom of the portion 8 and as illustrated it has mounted thereon suitable idle pulleys 18 whose peripheral belt grooves 19 are operatively associated with the peripheral belt groove 20 in the pulley 15 so as to insure the proper association of the driving belt with the pulley 15.

The lower magazine 21 which is secured beneath the table B supports the usual driven spindle 22 which has mounted thereon a pulley 23 which conforms with the pulley 15 upon the magazine 1. A bracket 24 is secured to one side of the lower magazine 21 and extending from said bracket are stud bolts 25. These bolts pass through the elongated slot 26 in an arm 27 of the belt tightener 28. Clamping nuts 29 upon the bolts 25 are adapted to engage against the arm 27 so as to hold the latter in an adjusted position. The arm 27 is provided with oppositely extending portions 30 upon which idle pulleys 31 are mounted. A driving belt 32 is passed over the pulley 23 and over the pulleys 31 and then over the pulleys 15 and 18 hereinbefore described. The said spindle 22 of the lower magazine 21 is belted as at 33 with the moving picture machine so that when power is applied to the latter for the purpose of drawing the film therethrough the power will be transmitted by way of the belt 32 to the coil or roll supporting tray 12 of the upper magazine 1. In this manner the film can be drawn from the tray of the upper magazine to the winding reel of the lower magazine 21 without effecting sudden pulling or jerking of the film.

It is stated that the upper magazine 1 is adjustable as to the adjustment of the table B which may be required to effect a proper framing of the picture on the screen. In view thereof the hinge 3 is provided with an ear 34 which has pivoted thereto a link 35. A similar ear 36 is secured to the bottom of the magazine 1 and it also pivotally supports a link 37. The link 35 has a slot 38 therein through which a bolt 39 of the link 37 extends. A nut 40 on the bolt may be adjusted to engage against the link 35 so as to hold the latter and the link 37 immovably connected. From this construction it is evident that the magazine 1 is operatively held in any required adjusted position and the tray 12 maintained in a horizontal position.

The winding reel 41 comprises companion disks 42 and 43, the former having secured thereto a hollow hub 44 through which a conical hub 45 of the disk 43 is adapted to be extended as shown in Fig. 8. The hub 44 is provided with radially disposed headed devices 46 which are adapted to be extended through the bayonet slots 47 in the disk 42. The disks 42 and 43 may be rotated relatively so as to bring the heads of the devices 46 into the arcuate reduced legs 48 of the bayonet slots. In this manner the disks 42 and 43 are securely connected together and the reel as a whole may be placed upon the spindle 22 of the magazine 1 and made to revolve therewith. The openings 48' in the companion disks are provided with short branches 49 which are adapted to receive the keys or legs 50 of the spindle 22 in the usual well known manner.

Mounted pivotally as at 51 within the portion 7 of the magazine 1 is an arm 52 whose inner end is provided with an elongated slot 53 through which the pin 54 of the guide bracket 55 is slidably mounted. The bracket 55 supports a depending socket member 56 which is adapted to receive the upper end of the driven shaft 13 as shown in Fig. 5. The bracket 55 is provided with a film guiding surface 57 and film guiding rollers 58, the latter being associated with the former so as to insure against the binding or resistance of the film in the tray 12 on the unwinding of the film. The magazine 1 is provided with an upper film guiding roller 59 and with lower film guiding rollers 60 and 61. The rollers 60 and 61 are yieldingly connected together by springs 62 and as illustrated these rollers are disposed in the opening 63 in the bottom of the said magazine 1. The hub 44 is provided with the usual film clamping spring 64.

Now that the details of construction of the improvement are clearly described it is stated that on the initial unwinding of a film the usual trade reel not shown is placed upon the spindle 11 in the magazine 1. One of our reels of the so-called separable sectional type is placed in the lower magazine 21. The film is then taken from the upper trade reel and passed over the roller 59 and then between the companion rollers 60 and 61 and then started through the moving picture machine in the usual manner and associated with the reel in the lower magazine 21. The moving picture machine is then operated so that the film will be wound from the upper magazine to the lower magazine. The front or starting end of the film when wound upon the reel 41 in the lower magazine will be disposed innermost as is evident. After the film has been shown in this manner the sections 42 and 43 of the reel in the said lower magazine 21 are disconnected and the section 42, together with the coiled film are placed in the pan 12 with the conical portion 45 extending in the direction of the upper end of the shaft 13. One of the reels 41 is placed in the magazine 21. The film is taken from the center of the coil in the pan 12 and passed between the guiding rollers 58 and it is then taken over the pulley 59 and passed between the rollers 60 and 61 and then operatively extended through the machine and connected with the winding reel in the magazine 21. It will of course be understood that the mechanism may be supplied with any desired number of reels such as the one shown at 41 so that after a film has been displayed it may be removed from the machine together with its winding reel and a new reel substituted and positioned in the mechanism so as to receive a new film in a manner identical with the initial operation previously described. The conical portion 45 of the section 42 of the reel is so constructed that the innermost wound portions of the film will be coiled slightly and the convolutions loosened relatively and held against binding with the resultant freedom of movement of the film from the tray.

We claim:—

1. In film winding mechanism for moving picture machines, upper and lower magazines, a shaft carried by the upper magazine and extending vertically through the bottom thereof, a tray fixedly connected with the shaft, a reel section removably mounted in the tray and having a hub receiving the shaft therethrough, an arm mounted for vertical swinging movements in the upper magazine and provided with a depending socket member receiving the upper end of said shaft, a film guide carried by the socket member, and means for revolving said shaft.

2. In film winding mechanism for moving picture machines, upper and lower magazines, a shaft carried by the upper magazine and extending vertically through the bottom thereof, a tray connected with the shaft, a reel section removably mounted in the tray and having a hub receiving the shaft therethrough, an arm mounted for vertical swinging movements in the upper magazine and provided with a depending socket member receiving the upper end of said shaft, a film guide carried by the socket member, and including companion revolubly mounted rollers, and a fixed guiding member disposed immediately above the tray at the center thereof and receiving the edge of the film thereagainst as the film is drawn between the rolls.

3. In film winding mechanism for moving picture machines, upper and lower magazines, a tray revolubly mounted in the upper magazine and including a supporting shaft having one of its ends disposed above the tray at the center thereof, a reel section removably mounted on the shaft and arranged in the tray and including a hub of a restricted diameter toward the bottom of the tray, an arm mounted for swinging movements in the upper magazine, a bracket slidably mounted at the free end of the arm and provided with a depending socket receiving the upper end of said shaft, a lower fixed film guiding surface extending substantially tangentially of the shaft and supported by the bracket, and companion film guiding rollers supported by the bracket and disposed above said fixed guiding member.

4. In film winding mechanism for moving picture machines, upper and lower magazines, a revolving reel support in the lower magazine, a tray revolubly mounted in the upper magazine, a driven shaft supporting the tray and having one of its ends extended thereabove, a driving connection between the tray supporting shaft of the upper magazine and the reel support of the lower magazine, a reel section removably mounted in the tray receiving the shaft therethrough, and a film guide disposed above the reel section and removably fitted to said shaft.

5. In film winding mechanism for moving picture machines, upper and lower magazines, a revolving reel support in the lower magazine, a tray revolubly mounted in the upper magazine, a driven shaft supporting the tray and having one of its ends extended thereabove, a driving connection between the tray supporting shaft of the upper magazine and the reel support of the lower magazine, a reel section removably mounted in the tray receiving the shaft therethrough, and a film guide disposed above the reel section and removably fitted to said shaft and mounted for swinging movements in said upper magazine.

6. In film winding mechanism for moving picture machines, a supporting table, a lower magazine fixedly supported upon the table, an upper magazine, a hinge including a leaf secured to the table and a leaf adjustably secured to the upper magazine, a link carried by the first leaf, a link carried by the upper magazine and slidably connected with the first link, and means for holding both links in fixed positions relatively whereby to maintain a fixed position of the upper magazine.

7. In film winding mechanism for moving picture machines, a table, a fixed lower magazine thereon, an upper horizontally and angularly adjustable magazine, a revolubly mounted shaft carried by the upper magazine, a tray carried by the shaft, a fixed horizontal pulley carried by the shaft, vertical guide pulleys associated with the fixed pulley, a bracket secured to the lower magazine, an arm mounted for horizontal adjustment on the bracket and provided with pulleys alined with the guide pulleys when the arm is adjusted to a predetermined position, a revolubly mounted reel support carried by the lower magazine and a driving belt passing over the lower reel support and over the pulleys of said arm and the guide pulleys and around the fixed pulley.

In testimony whereof we affix our signatures in presence of two witnesses.

JACOB B. MERKEL.
GEORGE J. CARROLL.

Witnesses:
SAMUEL R. BEARD,
REBECCA S. BEARD.

Copies of this patent may be obtained for five cents each, by addressing the "Commissioner of Patents, Washington, D. C."